United States Patent [19]

Hudson

[11] Patent Number: 4,796,365
[45] Date of Patent: Jan. 10, 1989

[54] UNDERWATER COMPASS SENSOR WITH COMPASS DITHER

[75] Inventor: Brian R. Hudson, Dallas, Tex.
[73] Assignee: Whitehall Corporation, Dallas, Tex.
[21] Appl. No.: 104,379
[22] Filed: Oct. 5, 1987
[51] Int. Cl.[4] .............................................. G01C 17/32
[52] U.S. Cl. ...................................... 33/356; 33/361; 310/323; 384/1
[58] Field of Search ..................... 384/1; 310/323, 317; 33/355 R, 356, 350, 344, 345, 361

[56] References Cited

U.S. PATENT DOCUMENTS

| | | | |
|---|---|---|---|
| 3,171,696 | 3/1965 | Houghton | 384/1 |
| 3,626,510 | 12/1971 | Kauzlarich | 384/1 |
| 4,523,120 | 6/1985 | Assard et al. | 310/323 |

Primary Examiner—William D. Martin, Jr.
Attorney, Agent, or Firm—Mason, Fenwick & Lawrence

[57] ABSTRACT

A compass dither device for use with a magnetic compass heading sensor unit for marine seismic streamers and the like having interrogating circuitry associated with the heading sensor to periodically provide a trigger pulse for interrogating a compass heading sensing components in the heading sensory unit and provide compass heading signals indicative of the heading of the compass the the time of interrogation, the compass dither device including a housing for the magnetic compass heading sensor unit having a dither coil encircling the portion where the headings sensory unit is positioned. Electronic dither circuitry produces a dither pulse having a pre-selected time relation with periodic interrogation of the heading sensor and causes current to be passed through the dither coil around the compass in a first direction and then in the opposite direction for a preselected time duration to activate the coil to provide a slight magnetic field causing the compass to move slightly to overcome any effects of static friction which might affect accuracy of compass heading signals upon interrogation.

8 Claims, 3 Drawing Sheets

UNDERWATER COMPASS SENSOR WITH COMPASS DITHER

BACKGROUND AND OBJECTS OF THE INVENTION

The present invention relates in general to means for activating the compass movement of a heading sensor having a magnetic compass to overcome bearing friction and free the compass movement to ensure tracking of small changes in heading, where heading changes are very slow and may cause the compass to stick, giving incorrect readings. More particularly, the present invention relates to compass dither means for activating a magnetic compass in the heading sensor of a marine seismic streamer or like application wherein the heading sensor changes heading very slow, to agitate the compass by momentarily vibrating it and thereby reduce errors arising from bearing friction and the like.

Heretofore, magnetic compasses have been employed in marine seismic streamers incorporated in an underwater heading sensor, for example, having am magnetic compass in a small cylindrical housing, which is pressure compensated and is electronically interrogated periodically to provide outputs signals indicating the compass heading of the seismic streamer or underwater owed array. In such seismic streamer and underwater towed array applications, it will be appreciated that frequently the changes in heading are very slow and it has been recognized that bearing friction inherent in the magnetic compass may cause the compass to stick so that very slow heading changes would not produce proper change in the compass heading and thus may give incorrect readings. A heading sensor having a magnetic compass incorporated therein, which is typical of those presently used in seismic streamers and underwater towed arrays, which is completely enclosed and provided with electronic circuitry so that readings are taken electronically at periodic intervals, may be of the type commercially produced by DigiCourse, Inc. of New Orleans, LA under its trademark DIGICOURSE and designed as a miniature underwater heading sensor, which is a rugged magnetic compass in a miniature cylindrical housing designed primarily for such seismic streamers and underwater towed array applications, constructed to withstand high shock and vibration levels that may occur during shipboard handling and implacement and retraction of the cable and array assembly. In such sensors, the magnetic compass is optically scanned and electrically interrogated, for example, once each 12 seconds, to determine the present heading of the sensor by a low current transmission line which may extend several hundred meters in length through the cable and lead portions of the seismic streamer assembly and provide pulse trains indicating the heading in degrees relative to magnetic north. Some examples of such headings sensor are disclosed in U.S. patents granted to DigiCourse Inc or the Laitram Corporation, including U.S. Pat. Nos. 3,746,842, 4,471,534, 4,093,946, 3,888,016, 3,833,901, 4,117,602 and 4,414,754.

The present invention involves means to electronically agitate the compass of a seismic streamer or underwater towed array heading sensor such as the type of heading sensor just described, by including a coil of wire surrounding the center of the heading sensor and the electronics to supply pulses of current to the coil to periodically generate a magnetic field which rotates the compass movement and effects such agitation as will vibrate the compass causing it to move slightly to overcome the effects of static friction. In the type of underwater heading sensor compass unit wherein the readings are taken electrically at periodical intervals, for example by interrogating the compass one each 12 seconds, the compass agitation system of the present invention involves pulsing the coil surrounding the compass housing during the period between interrogations to determine the compass readings, and thus electromagnetically agitate a compass card to avoid static friction affects and improvement accuracy of readings. In a preferred example, to be sure of some movement of the compass card, the agitated coil is pulsed in both directions during an agitating time period occurring between successive heading reading interrogations.

Other objects, advantages and capabilities of the present invention will become apparent from the following detailed declaration, taken in conjunction with the accompanying drawings illustrating a preferred embodiment of the invention.

DETAILED DESCRIPTION OF A PREFERRED EMBODIMENT

Figure 1:
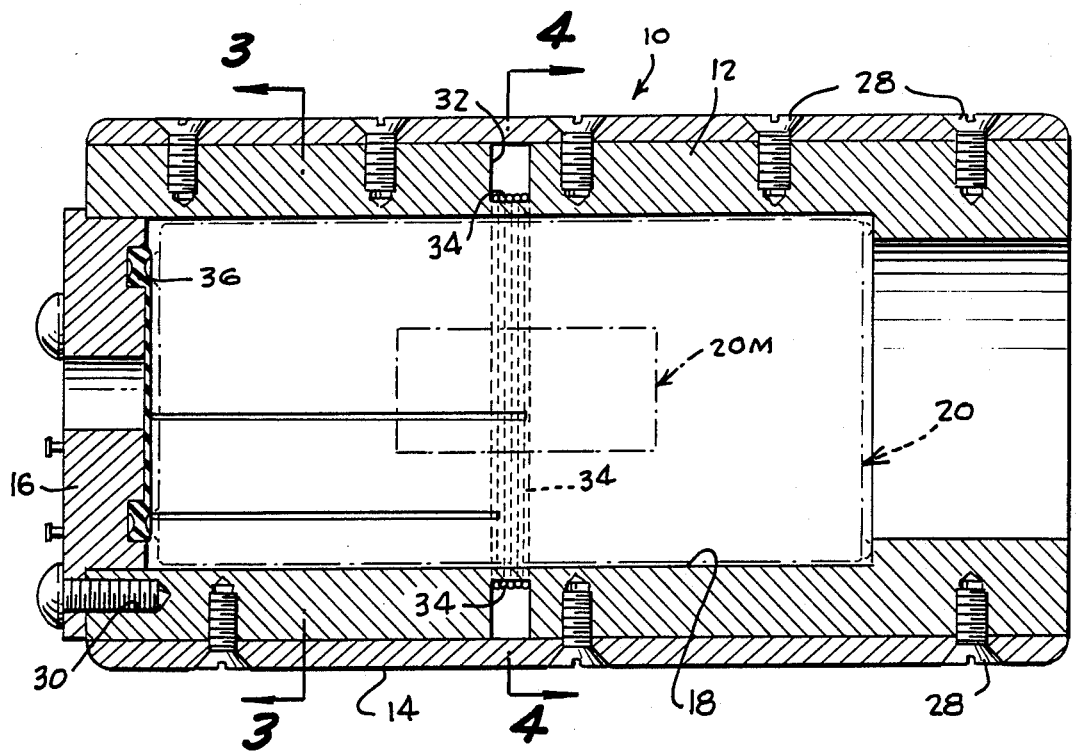
FIG. 1 is a vertical longitudinal section view of the housing incorporating a heading sensor and dither coil in accordance with the present invention.
Figure 2:
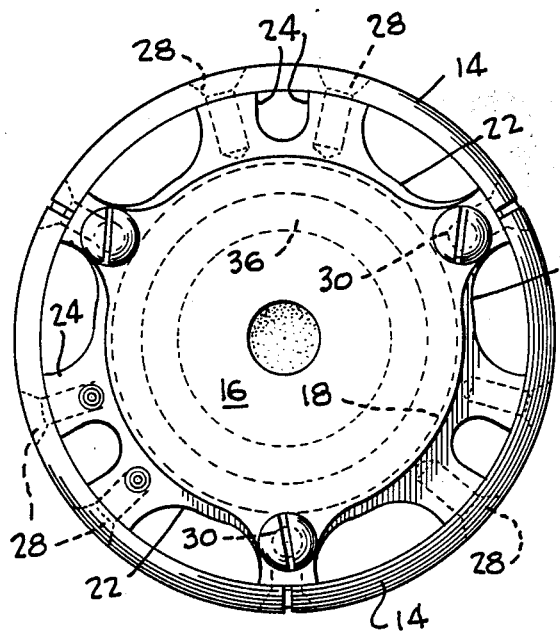
FIG. 2 is an end elevation view thereof.
Figure 3:
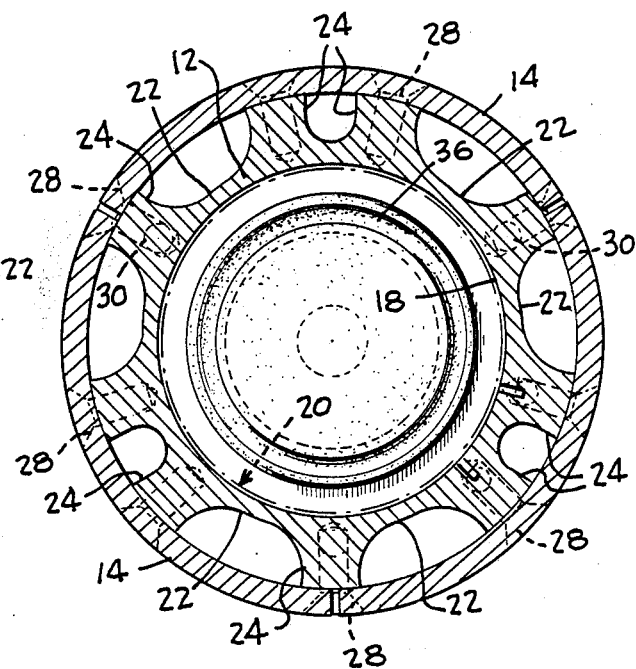
FIG. 3 is a vertical transverse section view of the housing for the heading sensor and dither.
Figure 4:
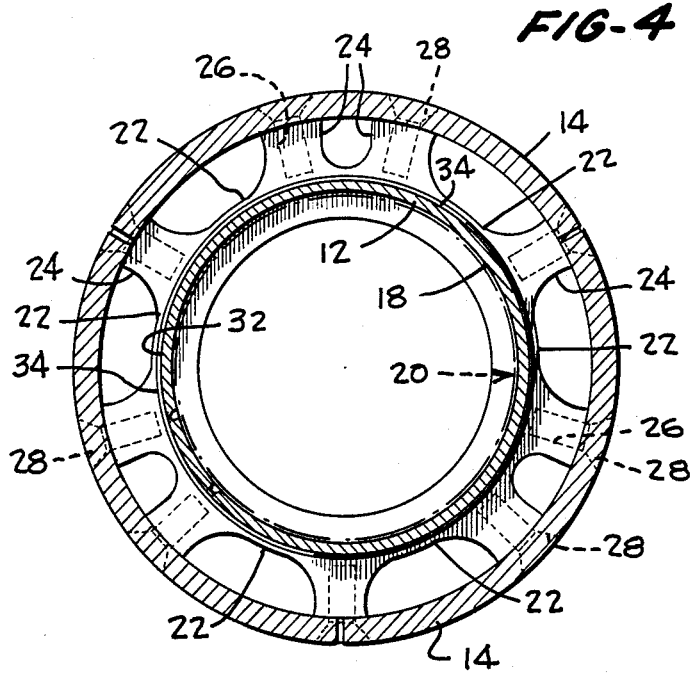
FIG. 4 is a vertical transverse section view taken along the line 4—4 of FIG. 2.
Figure 5:
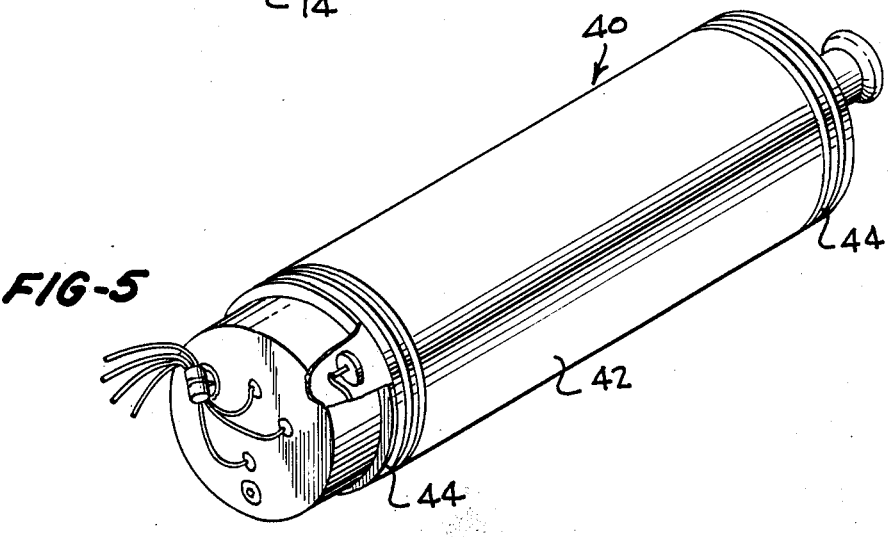
FIG. 5 is a perspective view of the electronic components housing assembly for the compass dither means.
Figure 6:
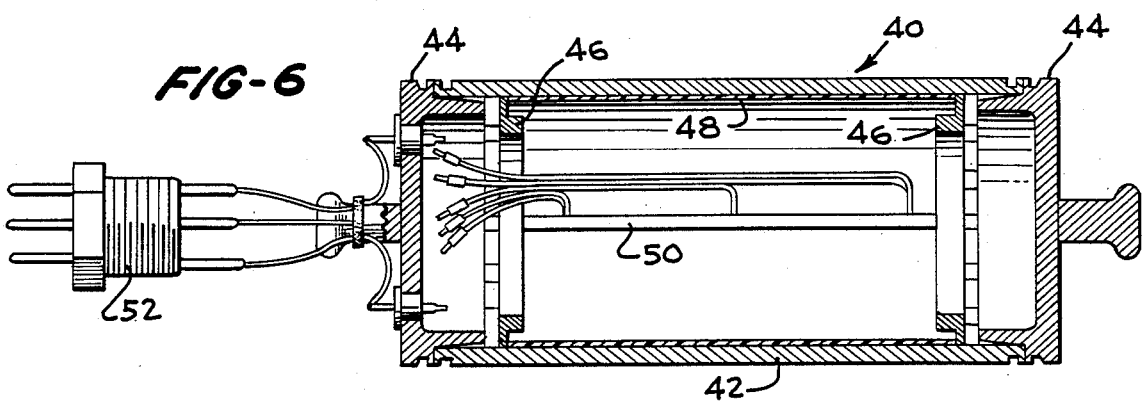
FIG. 6 is a vertical longitudinal section view thereof.

Referring to the drawings, wherein like reference characters designate corresponding parts throughout the several figures, the compass dither means of the present invention includes a housing, indicated generally by the reference character 10 formed of a body component 12, and outer surrounding shell 14, and an end cap 16, designed to be included in a section near the front or lead end portion of a marine seismic streamer or the like. The body component 12 of the heading sensor housing defines a hollow substantially cylindrical inner chamber 18 for receiving the underwater heading sensor, indicated at 20, which may be for example a DigiCourse model 315 miniature underwater heading sensor made by DigiCourse, Inc, a subsidiary of the Laitram Corporation, described generally as an optically scanned magnetic compass in a cylindrical housing which is pressure compensated, the magnetic compass including a compass card and associated means for interrogating the compass, for example once each 12 seconds, and providing output signals, for example in the form of a square wave serial pulse train, which is coded to indicate the heading and degrees relative to magnetic north. As schematically indicated in broken lines in FIG. 1, the heading sensor 20 internally incorporates a magnetic compass 20M, for example as disclosed in the Laitram Corporation U.S. Pat. No. 4,471,534. Compass interrogating circuitry forming part of the heading sensor system provides a trigger pulse supplied to the heading sensor to interrogate the compass sensor and provide output pulses indicating the heading, for example as disclosed in the above identified Laitram patents.

The outer surface portions of the body 12 include a plurality of convex cylindrical cavities 22 extending longitudinally along the body 12 and intervening flutes or ribs 24, many of which have radially inwardly extending bores or sockets 26, receiving screws 28 through registering openings in the outer shell cover 14, and bores 30 are provided in an end wall of the body at three locations for receiving screws removably fixing the end cap 16 to the body 12. Substantially midway along the length of the body 12 is a circumferential groove 32 which receives the dither coil 34 which entirely surrounds and encircles the chamber 18 in which the heading sensor 20 is housed. The sealing ring 36 is positioned against the inner face of the end cap 16 and associated with grooves receiving portions of the sealing ring to provide a secure water tight seal against the confronting face of the heading sensor 20.

Associated with this heading sensor housing to be positioned in the seismic streamer is an electronic component housing assembly 40, which comprises a cylindrical case 42 closed at opposite ends by a pair of end caps 44. A pair of spacers 46 are provided within the housing 40 adjacent the end caps, and a Mylar liner sheet 48 encircles the internal chamber which houses a printed circuit board 50 containing the electronic circuitry for activating the coil 34. This is provided as a sealed unit with the electric leads passing through epoxy sealed passages in one of the end caps 44 to a plug 52 for connection with the associated components.

Figure 7:
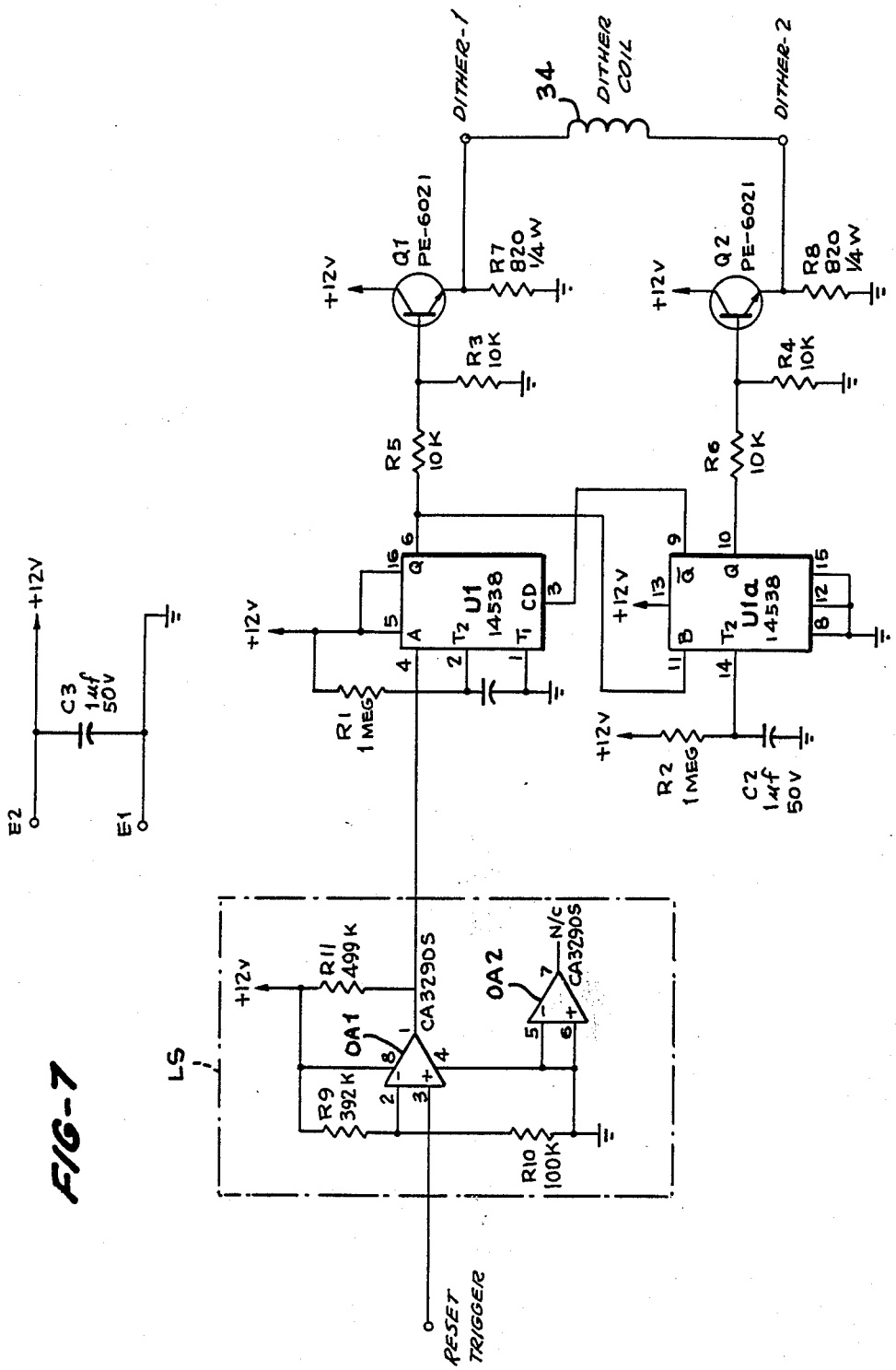
FIG. 7 is a schematic diagram of the compass dither circuitry shown connected to the dither coil incorporated in the heading sensor housing.

Referring to the schmetic diagram of FIG. 7, the circuitry comprises a level shifter, indicated generally at LS, formed of a pair of interconnected operational amplifiers OA1 and OA2, for example IC CA 3290S chips, connected as shown, for converting a 5 volt pulse to a 12 volt pulse, connected to the upper section U1 of a dual monostable multivibrator formed of two MC 14538BCP integrated circuit chips, connected to the gates of two transistors Q1 and Q2 each formed of a PE6021. The circuitry is designed to receive a positive going reset trigger pulse received from the compass interrogating circuit at pin 3 of the upper operational amplifier OA1 of the level shifter, which is converted to a 12 volt pulse and applied to the pin 4 of the upper section U1 of the dual monostable multivibrator. The dual monstable multivibrator U1, U1a provides an output pulse at pin 6 each time a positive pulse is applied at pin 4. The length of the pulse is determined by the values of the resistor R1 connected between pins 2 and 5 and the 12 volt supply and the capacitors C1 connected between pin 2 and 1 and ground. In one preferred example, the time for the pulse length is one second.

The pulse out of pin 6 of the dual monostable multivibrator causes the transistor Q1 to conduct, allowing current to pass through the dither coil 34 surrounding the heading sensor 20 in the chamber 18 of the housing 10, with the current through the coil returning through the resistor R8 connected to the transistor Q2. At the end of one second, the pulse form the pin 6 of the dual monostable multivibrator section U1 goes negative and is applied to the pin 11 of the multivibrator section U1a. This negative pulse causes a positive pulse to appear at the pin 10 of the dual multivibrator section U1a for one second. This in turn causes the transistor Q2 to conduct, passing current through the dither coil 34 in the opposite direction using resistor R7 connected to the transistor Q1 as the return path. The timing in this case is provided by the combination of the resistor R2 and capacitor C1 connected to the pin 14 of the monostable multivibrator section U1a and, in the illustrated embodiment, it is one second.

The current through the dither coil 34 is limited to approximately 10 milliampters by the voltage drops across the transistors Q1 and Q2 and the resistors connected with the transistors, while the resistance of the coil is very low in comparison.

The timing of the pulses through the dither coil 34 is designed to give the compass in the heading sensor 20 time to react to the magnetic field caused by the current in the dither coil 34. It is also designed to pulse immediately after the compass is in interrogated by the interrogating circuitry of the compass heading sensor thus allowing the compass to settle to the correct reading prior to the next interrogation. As previously stated, typically the compass is interrogated once every 12 seconds to determine its present heading.

I claim:

1. Underwater compass heading sensor and compass dither apparatus for marine seismic wherein the heading sensor includes a remote reading compass, compass heading sensing means, and interrogating circuitry associated with the heading sensor means to periodically provide a trigger pulse for interrogating the heading sensing means and to provide compass heading signals indicative of the heading of the compass at the time of interrogation; the apparatus comprising a housing for the magnetic compass heading sensor defining a chamber receiving the heading sensor therein and having a circumscribing coil-receiving recess, a dither coil comprising a plurality of electrically conductive coil windings in said recess encircling the portion of the housing in which the heading sensor is positioned, and electronic dither circuitry comprising means for producing a dither pulse having a preselected time relation with periodical interrogation of the heading sensor and causing current to be passed through the dither coil around the compass in a first direction for a preselected time duration to activate the coil to provide a light magnetic field causing the compass to move slightly to overcome any effects of static friction which might affect accuracy of compass heading signals upon interrogation.

2. Apparatus as defined in claim 1, wherein said electronic dither circuitry includes means responsive to the dither pulse for applying an activating pulse to a first transistor causing the transistor to conduct and pass current through the dither coil around the compass in a first direction for a pre-selected time duration to activate the coil to provide a slight magnetic field causing the compass to move slightly to overcome any effects of static friction which might affect accuracy of compass heading signals upon interrogation.

3. Apparatus as defined in claim 2, wherein said compass dither circuitry includes a second transistor connected to said dither coil and means for producing an activating pulse of opposite polarity relative to the first mentioned activating pulse to be applied to said second transistor in timed relation to activation of said first transistor to cause the second transistor to conduct and pass current through the coil in the opposite direction to provide a slight magnetic field causing the compass card to move in response thereto.

4. Apparatus as defined in claim 2, including a level shifter circuit means responsive to a reset trigger pulse from the interrogator circuity interrogating the heading sensor to provide an output pulse of different selected voltage level to said means for producing said first mentioned activating pulse to be applied to said first transistor.

5. Apparatus as defined in claim 3, including a level shifter circuit means responsive to a reset trigger pulse from the interrogator circuitry interrogating the heading sensor to provide an output pulse of different selected voltage level to said means for producing said first mentioned activating pulse to be applied to said first transistor.

6. Apparatus as defined in claim 3, wherein said means for producing said activating pulses for said first transistor and said second transistor is formed of a dual monostable multivibrator having a first section receiving an initiating pulse.

7. Apparatus as defined in claim 3, wherein said means for producing said activating pulses for said first transistor and said second transistor is formed of a dual monostable multivibrator having a first section receiving an initiating pulse from said level shifter and having an output connection to said first transistor for producing an activating pulse of selected time duration for causing said first transistor to conduct an pass current through said dither coil in said first direction and said dual monostable multivibrator having a second section connected to said first section thereof responding to the activating pulse supplied to said first transistor to produce an activating pulse and apply the same to said second transistor for causing said second transistor to conduct an pass current through said dither coil in the opposite direction.

8. Apparatus as defined in claim 5, wherein said means for producing said activating pulses for said first transistor and said second transistor is formed of a dual monostable multivibrator having a first section receiving an initiating pulse from said level shifter and having an output connection to said first transistor for producing an activating pulse of selected time duration for causing said first transistor to conduit an pass current through said dither coil in said first direction and said dual monostable multivibrator having a second section connected to said first section thereof responding to the activating pulse supplied to said first transistor to produce an activating pulse and apply the same to said second transistor for causing said second transistor to conduct and pass current through said dither coil in the opposite direction.

* * * * *